United States Patent [19]

Wilson et al.

[11] Patent Number: 4,687,631
[45] Date of Patent: Aug. 18, 1987

[54] TOP NOZZLE MOUNTED REUSABLE FASTENER DEVICE IN A RECONSTITUTABLE NUCLEAR FUEL ASSEMBLY

[75] Inventors: John F. Wilson, Murrysville Boro; Robert K. Gjertsen, Monroeville; Harry M. Ferrari, Pittsburgh, all of Pa.

[73] Assignee: Westinghouse Electric Corp., Pittsburgh, Pa.

[21] Appl. No.: 775,209

[22] Filed: Sep. 12, 1985

[51] Int. Cl.$^4$ .............................................. G21C 3/32
[52] U.S. Cl. .................................. 376/446; 376/447; 376/327; 403/21; 403/407.1
[58] Field of Search ............... 376/446, 440, 449, 353, 376/261, 447, 327; 403/21, 22, 407.1

[56] References Cited

U.S. PATENT DOCUMENTS

| | | | |
|---|---|---|---|
| 3,741,868 | 6/1973 | Qurnell et al. | 376/446 |
| 3,828,868 | 8/1974 | Jabsen | 376/446 |
| 3,878,042 | 4/1975 | Curulla et al. | 403/21 |
| 3,953,287 | 4/1976 | Long et al. | 376/440 |
| 3,992,259 | 11/1976 | Anthony et al. | 376/440 |
| 4,036,692 | 7/1977 | Walton | 376/440 |
| 4,064,004 | 12/1977 | Long et al. | 376/440 |
| 4,416,848 | 11/1983 | Feutrel | 376/446 |
| 4,452,755 | 6/1984 | Hylton | 376/440 |
| 4,563,328 | 1/1986 | Steinke | 376/446 |
| 4,585,366 | 4/1986 | Uchida | 403/21 |

FOREIGN PATENT DOCUMENTS

| | | | |
|---|---|---|---|
| 0048343 | 3/1982 | European Pat. Off. | 376/446 |
| 3228380 | 2/1984 | Fed. Rep. of Germany | 376/446 |

*Primary Examiner*—Deborah L. Kyle
*Assistant Examiner*—Daniel Wasil

[57] ABSTRACT

A reusable fastener device includes an attachment nut and a retainer housing mounted to the adapter plate of the fuel assembly top nozzle and removable with the top nozzle upon reconstitution of the fuel assembly. The attachment nut has a central tubular stem and upper and lower flanges connected to and extending radially outwardly from opposite ends of the stem. The stem is internally threaded for mating with the threaded upper end plug extension of the strucutural member. The upper flange of the nut has a conical-shaped lower surface and a periphery adapted for engagement in order to rotate the nut for threading onto and unthreading from the structural member extension between fastened and unfastened positions. The lower flange of the nut is in the form of a plurality of radial segments extending outwardly from the stem and angularly spaced from one another so as to define a plurality of cutouts therebetween which alternate with the segments. The retainer housing has a tubular hollow body and a plurality of upper sectors and lower tabs connected to and extending respectively radially inwardly and outwardly from opposite ends of the tubular body. The upper sectors are angularly spaced from one another so as to define a plurality of openings sized to receive the radial segments of the nut therethrough. Also, the upper sectors extend radially inwardly from the tubular body so as to define a central opening sized to receive the central stem of the nut and to define an interrupted conical-shaped upper surface surrounding the central opening which matches the conical-shaped lower surface on the upper flange of the nut. The lower tabs rest upon and are rigidly connected to the top nozzle adapter plate so as to align the central opening of the retainer housing with the hole through the adapter plate and dispose the upper sectors in a location spaced from the adapter plate at which their interrupted conical-shaped upper surface will be contacted by the conical-shaped lower surface of the upper flange of the nut when the central stem thereof is threaded onto the upper end extension of the structural member to the fastened position. The upper sectors are yieldably deflectible upon being contacted by the upper flange of the nut such that inner edges of the upper sectors engage the central stem of the nut so as to rotationally lock the lower flange of the nut to the adapter plate when the nut is rotated to its fastened position. Finally, the retainer housing also includes auxiliary tabs attached to the upper sectors and being bendable between open and closed positions for respectively allowing and preventing passage of the lower segments of the nut through the openings defined between the upper sectors of the retainer housing.

6 Claims, 11 Drawing Figures

TOP NOZZLE MOUNTED REUSABLE FASTENER DEVICE IN A RECONSTITUTABLE NUCLEAR FUEL ASSEMBLY

CROSS REFERENCE TO RELATED APPLICATION

Reference is hereby made to the following copending application dealing with related subject matter and assigned to the assignee of the present invention:

1. "Nuclear Reactor" by Harry M. Ferrari et al, assigned U.S. Ser. No. 732,200 and filed May 9, 1985.

2. "Bow Resistant Structural Member For Fuel Assemblies In Non-Control Rod Locations Of A Nuclear Reactor Core" by John F. Wilson et al, assigned U.S. Ser. No. 748,855 and filed June 26, 1985.

BACKGROUND OF THE INVENTION

1. Field of the Invention

The present invention relates generally to fuel assemblies for nuclear reactors and, more particularly, is concerned with reusable fastener devices mounted on a fuel assembly top nozzle for releasably attaching structural members thereto in a manner which simplifies removal and replacement of the top nozzle during reconstitution of the fuel assembly.

2. Description of the Prior Art

The cores of nuclear reactors conventionally include a plurality of fuel assemblies. In a typical pressurized water nuclear reactor (PWR), all fuel assemblies are geometrically alike. Each fuel assembly includes a multiplicity of fuel rods held in an organized array by grids spaced along the fuel assembly length. The grids are attached to a plurality of control rod guide thimbles. Top and bottom nozzles of the fuel assembly are secured to opposite ends of the guide thimbles which extend above and below the opposite ends of the fuel rods. The guide thimbles together with the top and bottom nozzles rigidly attached thereto compose the structural skeleton of the fuel assembly.

To control the fission process created by nuclear fuel contained in the fuel rods, typically a number of control rods are reciprocally positioned for movement in the guide thimbles of the fuel assembly. However, not all of the fuel assembly locations of a reactor core use control rods. Only about one-third of the fuel assemblies are in control rod locations. But since heretofore all PWR fuel assemblies have been constructed to be alike geometrically, this means that the fuel assemblies for control rod locations have been the same as those for non-control rod locations.

A departure from this prior practice of constructing all PWR fuel assemblies alike has been proposed recently. As described and illustrated in the first patent application cross-referenced above, a separate fuel assembly design for non-control rod locations includes a bottom nozzle, a number of longitudinally extending structural members which contain a burnable poison, and a top nozzle. It also includes a number of grids which are axially spaced and attached to the longitudinal structural members and support an array of fuel rods. The top and bottom nozzles are attached to the longitudinal structural members, and an instrumentation tube is located in the center of the assembly and supported by the top and bottom nozzles and by the grids.

One important difference in this non-control rod fuel assembly over the conventional control rod fuel assembly lies in the design of the longitudinal structural members which interconnects the top and bottom nozzles to form the structural skeleton of the assembly. In the conventional PWR assembly, the structural members are the hollow guide thimble tubes which are open at the top and closed at the bottom (except for small holes for coolant flow). These tubes are positioned within the fuel assembly to align with the control rods. During reactor operation, the control rods move reciprocally in the tubes. On the other hand, in the non-control rod fuel assembly intended for use in non-control rod core locations, the structural member also in the form of tubes do not receive control rods. Therefore, different functional as well as structural use can be made of the tubes.

Functionally, this non-control rod structural member contains burnable absorber material. Burnable absorbers, such as a suitable compound of boron, are used in modern reactors to provide an additional means for controlling reactivity especially at the beginning of life of the nuclear fuel. Structurally, the elongated tube of the structural member is closed at each end by end plugs which are welded to the tube. The tube and end plug material is preferably Zircaloy-4. A spring holds the absorber material in place in the tube and provides a plenum for accumulation of helium gas which is released when a neutron interacts with a boron atom. To assemble the non-control rod structural members into the fuel assembly, the tubes must be empty and open at one end. After the grids are bulge fitted to the tubes, the absorber material and springs are loaded into the tubes and the remaining one end plugs welded in place. The fuel rods are then loaded and the top and bottom nozzles are connected to the structural members.

The top end plug of each structural member has a threaded end extension which extends upwardly through one of a plurality of holes in the top nozzle adapter plate. The top nozzle is secured to the structural members, being preferably eight in number, by eight nuts which engage the end plug extension threads. This design is satisfactory from a conceptual design standpoint; however, during reconstitution of the fuel assembly, wherein the top nozzle is removed from and then replaced on the structural member, the nuts become loose parts. From a practical standpoint, this is not desirable.

Consequently, a need exists for an alternative approach to attaching the top nozzle on the structural members which will eliminate the problem of loose parts and thereby facilitate reconstitution of the non-control rod fuel assembly described above.

SUMMARY OF THE INVENTION

The present invention provides a top nozzle mounted reusable fastener device designed to satisfy the aforementioned needs. The fastener device of the present invention makes it possible to reconstitute the fuel assembly from its top end without loose parts. The device includes a retainer mounted on the top nozzle adapter plate which captures an attachment nut even when it is unfastened from the structural member upper end. The nut is thereby rendered reusable and the mechanics of removing and replacing the top nozzle greatly simplified. While the fastener device of the present invention is adapted for use in the non-control rod fuel assemblies of both cross-referenced applications, it is not so limited to such use only. It can also be used in other fuel assembly applications.

Accordingly, the present invention sets forth in a fuel assembly including a top nozzle with an adapter plate having at least one hole and at least one longitudinal structural member with a threaded upper end portion extendible through the adapter plate hole so as to project therefrom, a reusable fastener device which comprises: (a) attaching means threadable onto and from the upper end portion of the structural member between fastened and unfastened positions therewith for attaching and detaching the structural member to and from the top nozzle adapter plate; and (b) retaining means mounted on the top nozzle adapter plate so as to extend about the adapter plate hole and project outwardly from the adapter plate, the retaining means capturing the attaching means when in both the fastened and unfastened positions thereof and maintaining the attaching means with the top nozzle upon removal from the upper end portion of the structural member.

More particularly, the attaching means is in the form of a nut which includes a central tubular stem having upper and lower opposite ends and being internally threaded for mating with the threaded upper end portion of the structural member. Also, the nut includes upper and lower flanges connected to and extending radially outwardly from the respective upper and lower ends of the central stem. The upper flange has a conical-shaped lower surface and a periphery adapted for engagement in order to rotate the nut for threading onto and unthreading from the structural member upper end portion between fastened and unfastened positions. The lower flange is in the form of a plurality of radial segments extending outwardly from the central stem and angularly spaced from one another so as to defined a plurality of cutouts therebetween which alternate with the segements.

Still further, the retaining means is in the form of a housing which includes a tubular hollow body having upper and lower opposite ends, a plurality of upper sectors connected to and extending radially inwardly from the upper end of the tubular body and together defining a central opening, and a plurality of lower tabs connected to and extending radially outwardly from the lower end of the tubular body, the tabs resting upon and rigidly connected to the top nozzle adapter plate so as to generally align the central opening of the housing with the hole through the adapter plate. The upper sectors are angularly spaced from one another so as to define a plurality of openings sized to receive the radial segments of the lower flange of the nut therethrough. Also, the sectors extend radially inwardly from the tubular body so as to define the central opening sized to receive the central stem of the nut and to define an interrupted conical-shaped upper surface surrounding the central opening which matches the conical-shaped lower surface on the upper flange of the nut. The tubular body of the housing is attached by the lower tabs on the top nozzle adapter plate so as to dispose the upper sectors in a location spaced from the adapter plate at which their interrupted conical-shaped upper surface will be contacted by the conical-shaped lower surface of the upper flange of nut when the central stem thereof is threaded onto the upper end portion of the structural member to the fastened position. Additionally, the upper sectors are yieldably deflectible upon being contacted by the upper flange of the nut such that inner edges of the upper sectors engage the central stem of the nut so as to rotationally lock the lower flange of the nut to the adapter plate.

Furthermore, the retaining housing also includes means in the form of a plurality of auxiliary tabs attached to the upper sectors and being movable between open and closed positions for respectively allowing and preventing passage of the lower segments of the lower flange of the nut through the openings defined by the upper sectors of the retaining housing. The auxiliary tabs, being bendable, are connected to and extend outwardly from the upper sectors. The tabs extend adjacent to the openings between the upper sectors when disposed in the open positions and extend in overlying relation to the openings when disposed in the closed positions.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
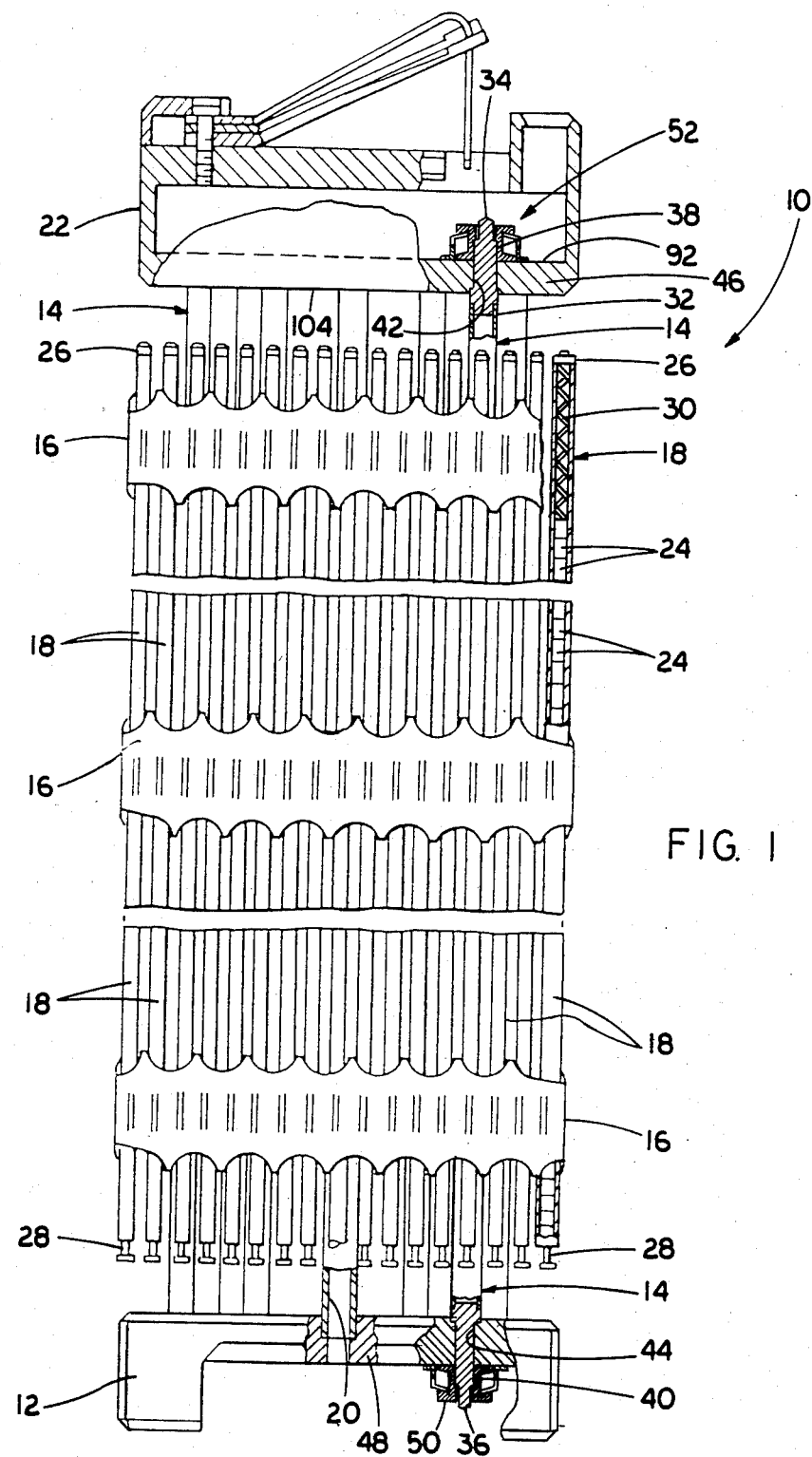
FIG. 1 is an elevational view, with parts broken away for clarity and partially in section, of a non-control rod fuel assembly including longitudinal structural members attached to the top nozzle of the assembly by the reusable fastener devices of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly adapted for use in non-control rod locations of a nuclear reactor core (not shown), represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending structural members 14 which at their lower ends are attached to and project upwardly from the bottom nozzle 12. The assembly 10 further includes a plurality of transverse grids 16 axially spaced along the structural members 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the structural members 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced axially along the fuel assembly length. Each fuel rod 18 includes nuclear fuel pellets 24 and is closed at its opposite ends by upper and lower end plugs 26,28 to hermetically seal the rod. Commonly, a plenum spring 30 is disposed in the rod 18 between the upper end plug 26 and the pellets 24 to maintain the pellets in a tight, stacked relationship therein. The fuel pellets 24 composed of fissile material are responsible for creating the reactive power of the nuclear reactor. A liquid moderator-coolant such as water, or water containing boron, is pumped upwardly along the fuel rods 18 of the fuel assembly 10 in order to extract heat generated therein for the production of useful work.

Each of the longitudinal structural members 14 includes an elongated hollow cladding tube 32 closed at each end by upper and lower end plugs 32,34 which are welded to the tube. The tube and end plug material is preferably Zircaloy-4. The upper and lower end plugs 32,34 have respective threaded studs or extensions 38,40 fixed thereto and extending axially therefrom which are inserted through holes 42,44 in the respective adapter plates 46,48 of the top and bottom nozzles 22,12. Whereas a nut 50 is tightened down on the threaded extension 40 for rigidly attaching the lower end of the structural member 14 to the bottom nozzle 12, the upper end of the structural member 14 is releasably attached to the top nozzle adapter plate 46 by the reusable fastener device of the present invention, generally designated 52, which will be described shortly. The structural member 14 may be pretensioned in accordance with the invention described and illustrated in the second application cross-referenced above in order to make it resistant to bowing.

Reusable Fastener Device

Turning now to FIGS. 2 to 11, there is seen the reusable fastener device 52 of the present invention which releasably attaches the threaded extension 38 on the upper end plug 34 of each of the structural members to the adapter plate 46 of the fuel assembly top nozzle 22.

Basically, the reusable fastener device 52 includes an attachment nut 54 and a retainer housing 56. The attachment nut 54 includes a central tubular stem 58 and upper and lower flanges 60,62 connected to and extending radially outwardly from opposite upper and lower ends 64,66 of the stem. The retainer housing 56 includes a thin-walled tubular hollow body 68, a plurality of upper sectors 70 and a plurality of lower tabs 72. The upper sectors 70 and lower tabs 72 are connected to and extend respectively radially inwardly and outwardly from opposite upper and lower ends 74,76 of the tubular body.

Figure 4:
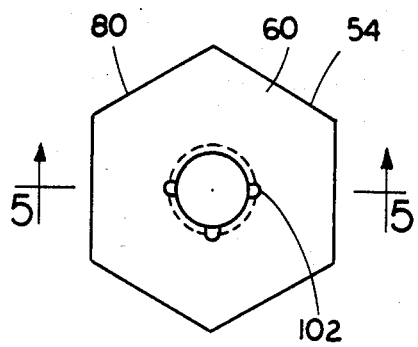
FIG. 4 is a top plan view of the attachment nut of the reusable fastener device as seen along line 4—4 of FIG. 5.
Figure 5:
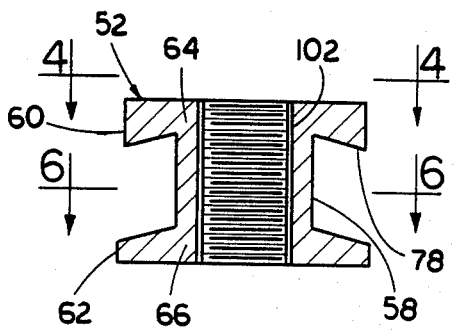
FIG. 5 is a sectional view of the attachment nut as taken along line 5—5 of FIG. 4.
Figure 6:
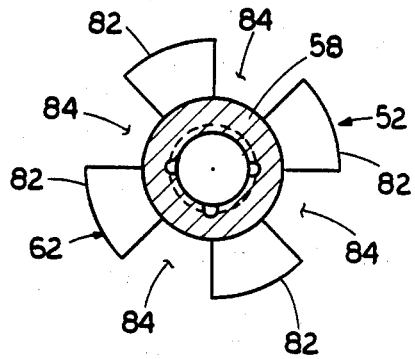
FIG. 6 is another sectional view of the attachment nut as taken along line 6—6 of FIG. 5
Figure 7:
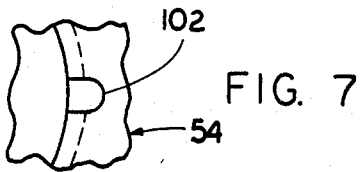
FIG. 7 is an enlarged view of a fragmentary portion of the attachment nut of FIG. 4, showing one of the slots along the internally threaded central bore of the attachment nut into which metal fragments which may be produced during threading and unthreading of the nut onto and from the threaded upper end portion of the structural member can be deposited.

Referring particularly to FIGS. 4 to 6, there is shown the attachment nut 54 having the central stem 58, upper flange 60 and lower flange 62. The central stem 58 of the nut 54 is internally threaded for mating with the threaded upper end extension 38 of the structural member upper end plug 34. The upper flange 60 of the nut 54 has a conical-shaped underside or lower surface 78 and a periphery 80, preferably hexagonal in configuration. The hexagonal periphery 80 adapts the nut 54 for engagement by a suitable socket tool (not shown) in order to rotate the nut for threading it onto and unthreading it from the structural member threaded extension 38 and thereby moving it between fastened and unfastened positions, depicted respectively in FIGS. 2 and 11. The lower flange 62 of the nut 54 is in the form of a plurality of radial segments 82 extending outwardly from the stem 58. The segments 82 are angularly spaced from one another so as to define a plurality of cutouts 84 therebetween which alternate with the segments.

Figure 8:
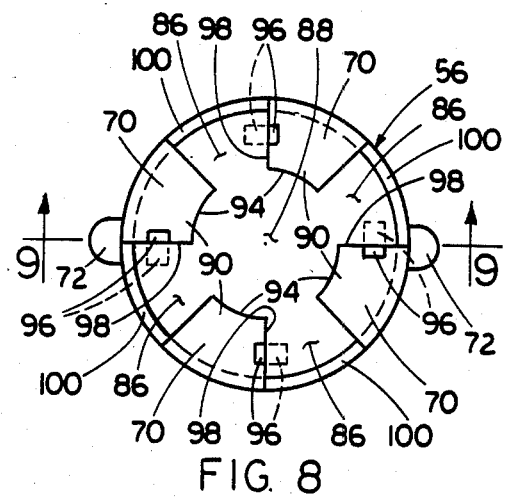
FIG. 8 is a top plan view of the retainer housing of the reusable fastener device which captures the attachment nut therein once the retainer housing is mounted upon the top nozzle adapter plate.
Figure 9:
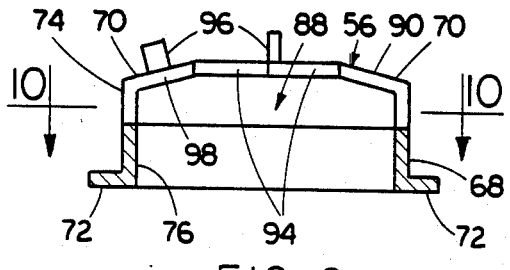
FIG. 9 is a sectional view of the retainer housing as taken along line 9—9 of FIG. 8.
Figure 10:
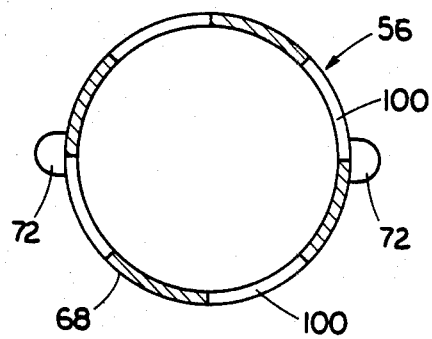
FIG. 10 is another sectional view of the retainer housing as taken along line 10—10 of FIG. 9.

Turning now to the FIGS. 8 to 10, there is shown the retainer housing 56 having the tubular body 68, the upper sectors 70 and the lower tabs 72. The upper sectors 70 of the retainer housing 56 are angularly spaced from one another so as to define a plurality of openings 86 therebetween which alternate with the sectors and are sized to receive therethrough the radial segments 82 of the attachment nut lower flange 62. Additionally, the upper sectors 70 extend radially inwardly from the tubular body 68 of the housing 56 so as to define a central opening 88 sized to receive the central stem 58 of the attachment nut 54. The upper sectors 70 together also define an interrupted conical-shaped upper surface 90 surrounding the central opening 88 which matches the conical-shaped lower surface 78 on the upper flange 60 of the attachment nut 54.

Figure 2:
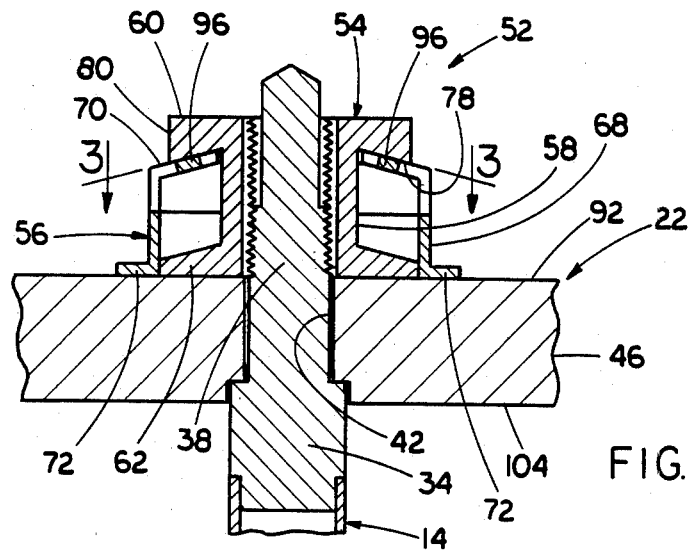
FIG. 2 is an enlarged fragmentary sectional view taken along line 2—2 of FIG. 3, illustrating one of the reusable fastener devices with its retainer housing mounted on the adapter plate of the fuel assembly top nozzle nad its attachment nut captured by the retainer housing being screwed on the threaded upper end portion of the respective structural member.

The lower tabs 72 of the retainer housing 56 rest upon and are rigidly connected, such as by spot welding, to an upper surface 92 of the top nozzle adapter plate 46 so as to align the central opening 88 of the retainer housing 56 with the respective hole 42 through the adapter plate 46. The tubular body 68, in being so attached to the adapter plate 46, disposes the upper sectors 70 in a location spaced above the adapter plate at which their interrupted conical-shaped upper surface 90 will be contacted by the conical-shaped lower surface 78 of the upper flange 60 of the nut 54 when the 58 central stem thereof is threaded to its fastened position onto the upper end extension 38 of the structural member 14, as seen in FIG. 2. The upper sectors 70 are yieldably deflectible radially inwardly upon being contacted by the upper flange 60 of the attachment nut 54, as the nut is tightened down on the structural member extension 38, such that inner edges 94 of the upper sectors 70 engage the central stem 58 of the nut 54 and rotationally lock its radial segments 82 to the adapter plate 46 when the nut reaches its fastened position.

Figure 3:
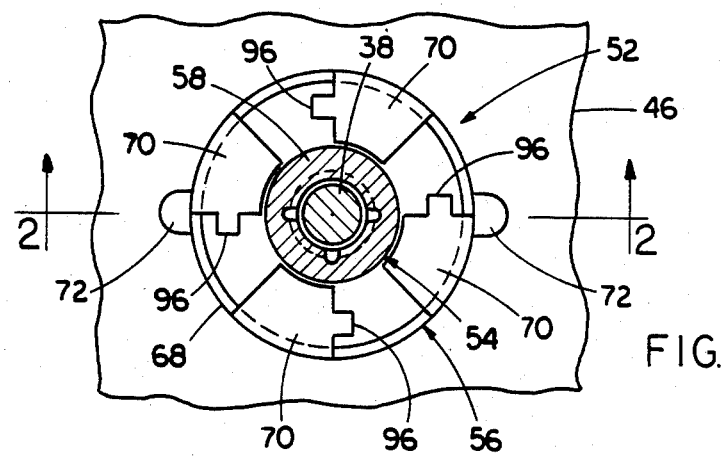
FIG. 3 is a top plan view, partly in section, of the reusable fastener device as seen along line 3—3 of FIG. 2

Additionally, as seen best in FIGS. 3, 8 and 9, the retainer housing 56 also includes means in the form of a plurality of auxiliary tabs 96 attached to the upper sectors 70 and being movable between open and closed positions for respectively allowing and preventing passage of the lower radial segments 82 of the nut 54 through the openings 86 defined by the upper sectors 70. Each of the auxiliary tabs 96, being bendable, is connected to and extends outwardly from a radial edge 98 of one of the upper sectors 70. The tabs 96 extend adjacent to the openings 86 between the upper sectors 70 when disposed in their open positions, as seen in solid line form in FIG. 8 and in FIG. 9, so as to allow passage of the radial segments 82 on the nut 54 through the openings 86 and installation thereof into the housing 56. On the other hand, the tabs 96 extend in overlying relation to the openings 86 when disposed in their closed positions, as seen in FIG. 3 and in dotted outline form in FIG. 8, so as to obstruct passage of the nut segments 82 therethrough. By bending the tabs 96, they can be readily moved between their open and closed positions. It is also readily apparent that the auxiliary tabs 96 could be attached on the upper edges 100 of the tubular body 68 to perform the same function.

Preferably, the threads on the upper end plug extension 38 end at a given distance below the upper sectors 70 of the retainer housing 56 so as to terminate upward axial movement of the nut 54 as it is rotated during unthreading from the structural member extension 38. In such manner, any tendency for the lower flange 62 to force the auxiliary tabs 96 outwardly from their closed to open positions is eliminated. Also, as an added feature seen in FIG. 7 as well as in FIGS. 4 and 5, to prevent galling of the nut 54 and end plug extension 38, the nut can have small flutes or slots 102 defined in its central stem 58. The slots 102 will collect any chips or balls of material which may form at the threaded interface and prevent them from galling the threads.

Figure 11:
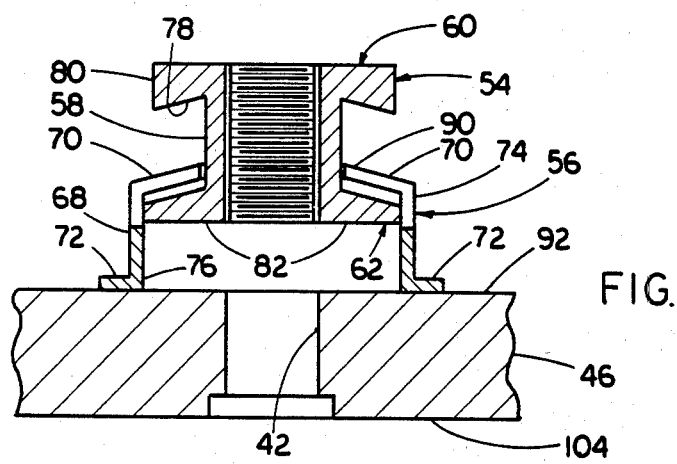
FIG. 11 is a view similar to that of FIG. 2, but illustrating the attachment nut of the reusable fastener device captured by the retainer housing now unscrewed from the threaded upper end portion of the respective structural member which has been withdrawn from the top nozzle adapter plate hole.

Further, by proper design of the retainer housing 56 and attachment nut 54 so that the inside diameter of the hollow body 68 and the outside diameter of the lower flange 62 are disposed in an interference fit, the nut 54 will remain in the raised and unfastened position seen in FIG. 11 when detached from the structural member extension 38. This makes it easier to reassemble the nut, although it is not absolutely necessary. Finally, the structural member upper end plug 34 can be rotationally locked to the underside or lower surface 104 of the adapter plate 46 by using a conventional tongue and groove arrangement.

To detach and remove the top nozzle 22, a socket wrench (not shown) is engaged with the upper flange periphery 80 of the attachment nut 54 which is always disposed above the retainer housing 56. As the nut is rotated, its lower flange 62 is forced upwardly within the retainer housing 68 from the fastened position of FIG. 2 to the unfastened position of FIG. 11. Then, to reassemble and reattach the top nozzle 22, the top nozzle is put back in place such that the extension 38 on the structural member 14 extends upwardly through the adapter plate hole 42. The nut 54 is then threaded back on the extension 38 and screwed down to the adapter plate 46. The downward motion of the nut 54 with respect to the retainer housing sectors 70 forces them radially inward into hard contact with the stem 58 of the nut, as seen in FIGS. 2 and 3, which again locks the nut against undergoing further rotation.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a fuel assembly including a top nozzle with an adapter plate having at least one hole and at least one longitudinal structural member with a threaded upper end portion extendible through the adapter plate hole so as to project therefrom, a reusable fasterner device comprising:
   (a) attaching means threadable onto and from said upper end portion of said structural member between fastened and unfastened positions therewith for attaching and detaching said structural member to and from said top nozzle adapter plate; and
   (b) retaining means mounted on said top nozzle adapter plate so as to extend about said adapter plate hole and project outwardly from said adapter plate, said retaining means capturing said attaching means when in both said fastened and unfastened positions thereof and maintaining said attaching means with said top nozzle upon removal from said upper end portion of said structural member;
   (c) said attaching means including
      (i) a central tubular stem having upper and lower opposite ends and being internally threaded for mating with said threaded upper end portion of said structural member, and
      (ii) an upper flange connected to and extending radially outwardly from said upper end of said central stem, said upper flange having a lower surface and a periphery adapted for engagement in order to rotate said attaching means for threading onto and unthreading from said structural member upper end portion between said fastened and unfastened positions;
   (d) said retaining means including
      (i) a tubular hollow body having upper and lower opposite ends and a plurality of upper sectors connected to and extending radially inwardly from said upper end of said tubular body,
      (ii) said upper sectors together defining a central opening sized to receive said central stem of said attaching means and an interrupted upper surface surrounding said central opening which matches said lower surface on said upper flange of said attaching means being disposed above said upper sectors of said retaining means,
      (iii) said upper sectors being disposed in a location spaced from said adapter plate at which their interrupted upper surface will be contacted by said lower surface of said upper flange of said attaching means when said central stem thereof is threaded onto said upper end portion of said structural member to said fastened position therewith, (iv) said upper sectors being yieldably deflectible upon being contacted by said upper flange of said attaching means such that inner edges of said upper sectors engage said central stem of said attaching means so as to rotationally lock said attaching means to said adapter plate when said attaching means is at said fastened position.

2. The reusable fastener device as recited in claim 1, wherein said retaining means includes a a plurality of lower tabs connected to and extending radially outwardly from said lower end of said tubular body, said tabs resting upon and rigidly connected to said top nozzle adapter plate so as to generally align said central opening of said retaining means with said hole through said adapter plate.

3. In a fuel assembly including a top nozzle with an adapter plate having at least one hole and at least one longitudinal structural member with a threaded upper end portion extendible through the adapter plate hole so as to project therefrom, a reusable fastener device comprising:

(a) an attachment nut including
   (i) a central tubular stem and upper and lower flanges connected to and extending radially outwardly from opposite ends of said stem,
   (ii) said stem being internally threaded for mating with said threaded upper end portion of said structural member,
   (iii) said upper flange having a conical-shaped lower surface and a periphery adapted for engagement in order to rotate said attachment nut for threading onto and unthreading from said structural member upper end portion between fastened and unfastened positions,
   (iv) said lower flange being in the form of a plurality of radial segments extending outwardly from said stem and angularly spaced from one another so as to define a plurality of cutouts therebetween which alternate with said segments; and (b) a retainer housing including
   (i) a tubular hollow body and a plurality of upper sectors and lower tabs connected to and extending respectively radially inwardly and outwardly from opposite ends of said tubular body,
   (ii) said upper sectors being angularly spaced from one another so as to define a plurality of openings sized to receive said radial segments of said attachment nut therethrough,
   (iii) said upper sectors extending radially inwardly from said tubular body so as to define a central opening sized to receive said central stem of said attachment nut and to define an interrupted conical-shaped upper surface surrounding said central opening which matches said conical-shaped lower surface on said upper flange of said attachment nut,
   (iv) said lower tabs resting upon and rigidly connected to said top nozzle adapter plate so as to align said central opening of said retainer housing with said hole through said adapter plate and dispose said upper sectors in a location spaced from said adapter plate at which their interrupted conical-shaped upper surface will be contacted by said conical-shaped lower surface of said upper flange of said attachment nut when said central stem thereof is threaded onto said upper end portion of said structural member to said fastened position therewith,
   (v) said upper sectors being yieldably deflectible upon being contacted by said upper flange of said attachment nut such that inner edges of said upper sectors engage said central stem of said attachment nut so as to rotationally lock said lower flange of said attachment nut to said adapter plate when said attachment nut is at said fastened position,
   (vi) said retainer housing also including means attached to one of said tubular body and upper sectors and being movable between open and closed positions for respectively allowing and preventing passage of said lower segments of said attachment nut through said openings defined by said upper sectors of said retainer housing.

4. In a fuel assembly including a top nozzle with an adapter plate having at least one hole and at least one longitudinal structural member with a threaded upper end portion extendible through the adapter plate hole so as to project therefrom, a reusable fastener device comprising:

(a) attaching means threadable onto and from said upper end portion of said structural member between fastened and unfastened positions therewith for attaching and detaching said structural member to and from said top nozzle adapter plate; and (b) retaining means mounted on said top nozzle adapter plate so as to extend about said adapter plate hole and project outwardly from said adapter plate, said retaining means capturing said attaching means when in both said fastened and unfastened positions thereof and maintaining said attaching means with said top nozzle upon removal from said upper end portion of said structural member;

(c) said attaching means including
   (i) a central tubular stem having upper and lower opposite ends and being internally threaded for mating with said threaded upper end portion of said structural member,
   (ii) an upper flange connected to and extending radially outwardly from said upper end of said central stem, said upper flange having a lower surface and a periphery adapted for engagement in order to rotate said attaching means for threading onto and unthreading from said structural member upper end portion between said fastened and unfastened positions, and
   (iii) a lower flange connected to and extending radially outwardly from said lower end of said central stem, said lower flange being in the form of a plurality of radial segments extending outwardly from said stem and angularly spaced from one another so as to define a plurality of cutouts therebetween which alternate with said segments;

(d) said retaining means including
   (i) a tubular hollow body having upper and lower opposite ends,
   (ii) a plurality of upper sectors connected to and extending radially inwardly from said upper end of said tubular body, said upper sectors being angularly spaced from one another so as to define a plurality of openings sized to receive said radial segments of said attaching means lower flange therethrough, and (iii) a plurality of lower tabs connected to and extending radially outwardly from said lower end of said tubular body said tabs resting upon and rigidly connected to said top nozzle adapter plate so as to generally align said central opening of said retaining means with said hole through said adapter plate and dispose said upper sectors at a location spaced from said adapter plate at which their interrupted upper surface will be contacted by said lower surface of said upper flange of said attaching means when said central stem thereof is threaded onto said upper end portion of said structural member to said fastened position;

(iv) said upper sectors being yieldably deflectible upon being contacted by said upper flange of said attaching means such that inner edges of said upper sectors engage said central stem of said attaching means so as to rotationally lock said lower flange of said attaching means to said adapter plate when said attaching means is at said fastened position.

5. The reusable fastener device as recited in claim 4, wherein said retaining means also includes means attached to one of said tubular body and upper sectors and being movable between open and closed positions for respectively allowing and preventing passage of said lower segments of said attaching means lower flange through said openings defined by said upper sectors of said retaining means.

6. The reusable fastener device as recited in claim 5, wherein said movable means take the form of auxiliary bendable tabs connected to and extending outwardly from said upper sectors, said tabs extending adjacent to said openings between said upper sectors when disposed in said open positions and extending in overlying relation to said openings when disposed in said closed positions.

* * * * *